United States Patent [19]
Kaufmann

[11] 3,739,893
[45] June 19, 1973

[54] METHOD AND APPARATUS FOR TRANSFERRING GRAIN

[75] Inventor: Henry H. Kaufmann, Saint Louis Park, Minn.

[73] Assignee: Cargill, Incorporated, Minneapolis, Minn.

[22] Filed: Jan. 31, 1972

[21] Appl. No.: 221,919

[52] U.S. Cl. .................................. 193/17, 141/93
[51] Int. Cl. ........................................... B65g 11/00
[58] Field of Search ................ 193/22, 2 R, 3, 17, 193/18, 19; 141/93

[56] References Cited
UNITED STATES PATENTS

| | | | |
|---|---|---|---|
| 3,378,124 | 4/1968 | Martin | 193/2 R |
| 403,830 | 5/1889 | Flood | 193/2 R |
| 3,241,581 | 3/1966 | Richardson et al. | 141/93 |
| 2,524,560 | 10/1950 | Cote | 141/93 X |
| 644,855 | 3/1900 | Forster | 141/93 X |

FOREIGN PATENTS OR APPLICATIONS
408,810  4/1934  Great Britain ...................... 141/93

*Primary Examiner*—Richard E. Aegerter
*Assistant Examiner*—H. S. Lane
*Attorney*—William E. Anderson, Edwin M. Luedeka, Morgan L. Fitch, Jr. et al.

[57] ABSTRACT

Apparatus and the method are provided for restricting air pollution and for conveying grain from a grain source to a desired location at a lower elevation than the grain source. In the method, grain is conveyed downwardly from the grain source to a second location. The grain is enclosed during the conveyance and a flow of air is established upwardly and countercurrent to the grain flow when enclosed. The air flow is established at sufficient velocity to pick up dust from a discharge point and remove the dust during grain flow.

13 Claims, 3 Drawing Figures

PATENTED JUN 19 1973

3,739,893

METHOD AND APPARATUS FOR TRANSFERRING GRAIN

The present invention relates generally to apparatus and a method for restricting air pollution during conveying of grain from a grain source to a desired location at a lower elevation than the grain source. More particularly the invention relates to restricting air pollution during loading of ships or barges with grain.

Dust control during loading of ships or barges with grain has always posed a problem because of the large amounts of grain involved. The grain, as it is being transferred from a grain elevator, tends to abrade against itself and produce large quantities of dust. It has generally not been possible to contain the dust suspended in the displaced air within the hold of the ship and the dust usually moves from the hold of the ship into the surrounding atmosphere. A complicating factor is that the loading spout used to load grain into the hold of the ship acts much like a pump and entrains a volume of air of from two to five times the volume of the grain moved through the spout. The entrained air volume plus the volume of grain which is loaded into the ship displaces air within the hold of the ship and moves the displaced dust laden air rapidly from the hold of the ship into the surrounding atmosphere. Of course, the dust laden air which is displaced from the hold of the ship into the surrounding atmosphere contributes to air pollution.

Various apparatus has been proposed to alleviate the dust problem encountered during the loading of grain into a ship's hold. In this connection, it has been proposed to move air from the ship's hold by vacuum or pressure pumping means to apparatus which could remove the dust from the air. However, such proposed apparatus and methods for removing dust laden air from the holds of ships have not proven successful in that the apparatus is cumbersome, costly and has not been completely effective to alleviate the dust problem.

It would be desirable to restrict air pollution during the conveyance of grain from a grain source to a desired location at a lower elevation than the grain source. In particular, it would be desirable to restrict air pollution during loading of grain into the hold of a ship.

Accordingly, it is the principal object of the present invention to provide apparatus and a method for restricting air pollution during transfer of grain from a grain source to a desired location at a lower elevation than the grain source. It is another object of the present invention to provide apparatus and a method for restricting air pollution during transfer of grain. A further object of the present invention is to provide apparatus and a method for restricting air pollution during loading of grain into the hold of a ship.

These and other objects of the invention will become more apparent from the following detailed description and the accompanying drawing, wherein.

Generally, the present invention is directed to apparatus for restricting air pollution and for conveying grain from a grain source to a desired location at a lower elevation than the grain source. The apparatus includes a transfer tube connected to a grain source at its inlet end. In the grain industry the transfer tube is generally referred to as a "spout" and usually consists of an assembly of conduits which may have round, rectangular or square cross sections. The transfer tube extends downwardly from the grain source and provides means whereby the grain moves from the grain source by gravity to a outlet discharge point for loading trucks, railroad cars, barges or ships. The apparatus further includes air flow producing means and a duct connected to the air flow producing means. The duct is also connected to the transfer tube at a point intermediate the ends of the transfer tube. The apparatus further includes a baffle positioned within the transfer tube and located between the inlet end of the transfer tube and the point of connection of the duct with the transfer tube.

The present invention is also directed to a method for transferring grain without air pollution from a grain supply source by gravity. In general, in a method embodying various features of the invention, grain is conveyed downwardly from a grain source to a second location. The grain is enclosed during conveyance. An upward flow of air is established which is countercurrent to the grain flow when enclosed. The air flow enters from the second location and is established at sufficient velocity to pick up dust at the second location and remove the dust during grain flow. The air flow is discharged at a point between the grain source and the second location.

Figure 1:
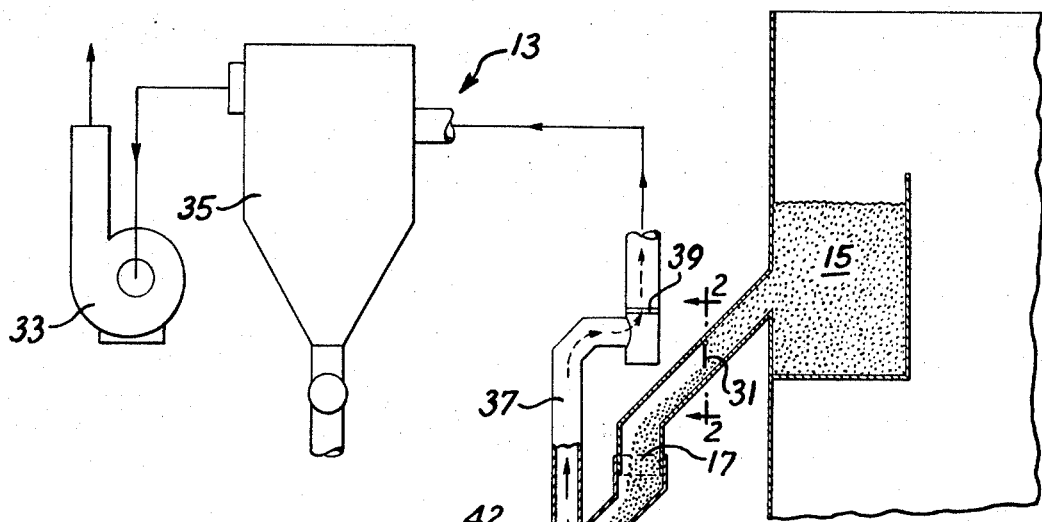
FIG. 1 is a schematic representation of grain transfer apparatus including a transfer tube assembly connected to a grain source at its inlet end wherein grain moves by gravity to the outlet end of the transfer assembly tube.

Now looking at FIG. 1, the apparatus of the invention will be particularly described. The apparatus includes a transfer tube assembly 11 and an air flow system 13. The transfer tube assembly is comprised of various interconnected tubes. The transfer tube assembly is connected to a grain supply source at its inlet end the grain is moved through the transfer tube assembly from the grain source to the outlet end of the transfer tube assembly. The transfer tube assembly may be a straight section of rigid tubing but preferably is provided with various means to adjust the height and lateral movement of the transfer tube assembly to permit even distribution of grain at various levels and lateral location. In this connection, a pivot point for lateral movement is provided by the jointed connection at 17. The pivoted connection allows the transfer tube assembly to be displaced laterally from side to side. A knuckle assembly 19 permits the lower portion of the transfer tube assembly to be arcuately moved in a vertical direction by suitable means (not shown). The knuckle assembly 19 comprises a shroud 21, wiper curtain 23 and displacement section 25. The displacement section 25 aids in restricting the open area within the shroud 21 so as to limit air flow entering or exiting from the knuckle assembly. The displacement section 25 and wiper curtain 23 cooperate to further restrict entrance or exit of air at the knuckle assembly 19. Telescoping sections 27 and 29 permit vertical adjustment of the outlet end of the transfer tube assembly without arcuate displacement. Baffle 31 is provided to inhibit or prevent the flow of air from the grain source into the air flow system, as will be more fully described hereinafter. Baffle 31 is most clearly shown in FIG. 2.

The air flow system 13 includes a blower 33, dust collector 35 and duct 37. Any suitable dust collector may be used. A preferred type of dust collector is one which includes a cyclone and a bag filter as an integral unit. Duct 37 is provided with a pivot point 39 to permit duct 37 to laterally move in response to the movements of the transfer tube assembly 11.

It has been found that the air flow should be bypassed around the knuckle assembly 19. Downwardly flowing grain tends to build up in the knuckle assembly and restricts countercurrent upward air movement through the knuckle assembly. Air is bypassed around the knuckle assembly by means of telescoping semicircular sections 41 and 42.

Figure 3:
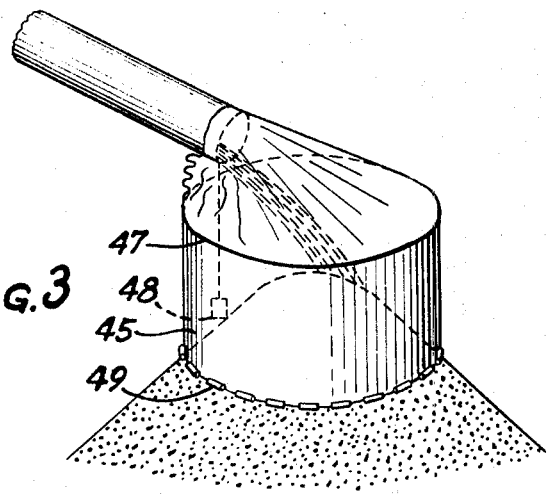
FIG. 3 is an enlarged view illustrating various features of the outlet end of the transfer tube assembly of FIG. 1.

A preferred embodiment of the present invention is shown in FIG. 3. In this embodiment the outlet end of the transfer tube assembly is covered with a hood assembly 43. The hood assembly 43 includes a hood curtain 45 which is spread in a circular or otherwise suitable shape by means of a guide ring 47. The hood curtain is caused to hang substantially vertical by means of weights 49 attached to the lower portion of the hood curtain. The hood assembly 43 is particularly suitable for use in adverse conditions such as windy conditions. If windy conditions are prevalent at a loading dock, an appreciable proportion of the dust may be moved a sufficient distance from the end of the spout so that the efficiency of removal of the counter-flowing air system of the invention will be reduced.

As the grain pile grows beneath the outlet end of the transfer tube assembly the height of the outlet end above the grain pile must be raised by moving the bottom section 27 of the telescoping portion of the transfer tube assembly. Movement of the telescoping section 27 may be effected manually by means of an operator who observes the rise in height of the grain pile. However, if the operator is inattentive, grain can pile to a sufficient height to fill the hood assembly and back up into the outlet end of the transfer tube assembly. In order to avoid blockage of the transfer tube assembly it is preferred to use a suitable probe 48 to sense the growth of the grain pile and provide a signal which can be used to control raising of the spout. Suitable sensing probes are well known. The "Sensiprobe" manufactured by Western Marine Electronics Company, is typical of a suitable sensing apparatus. This sensor has a vibrator whose amplitude is dampened when the grain pile makes contact with the sensor. A signal is then sent to a relay which controls a motor which moves the telescoping section 27 of the tube transfer assembly upward a predetermined distance. Other suitable sensing probes are those activated by microswitches or capacitors.

In operation, the blower 33 is turned on prior to starting a flow of grain within the transfer tube assembly 11. A suitable gate blocking the inlet of the transfer tube assembly (not shown) is then opened and grain flows down the transfer tube assembly to the outlet end. The flow of grain within the transfer tube assembly is controlled so that only sufficient grain flows within the transfer tube assembly so as to fill less than the whole portion of the various tubes which comprise the transfer tube assembly. In this connection, it is preferred that the grain flow be such that less than about half of the tube cross section is filled with grain. It is not necessary that the grain be completely disposed in the lower half of the tube. Under some conditions of grain flow and air flow, the air tends to fluidize the grain and the grain will be substantially uniformly dispersed throughout the cross sectin of the tube.

Figure 2:
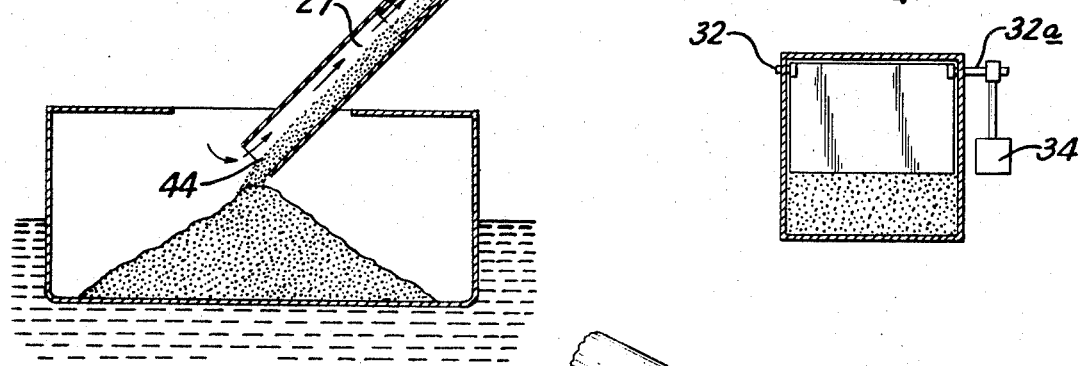
FIG. 2 is a cross sectional taken along line 2—2 of FIG. 1.

After the grain leaves the source it tends to pile against the baffle 31 and the baffle 31 in combination with the grain flow under the baffle substantially restricts any flow of air from the grain source into the duct 37 of the air flow system. The restriction of air flow from the grain source into the duct 37 is important to prevent overloading the air flow system and reducing its efficiency. The baffle 31 may be a rigid barrier which obstructs an upper portion of a transfer tube. It is preferred, however, that the baffle 31 be hinged at its upper edge and that it be located in a rectangular or square section of transfer tube as shown in FIG. 2. The baffle 31 is hinged about pivot points 32 and 32 A. The baffle 31 is also provided with a counterweight 34. The counterweight 34 holds the baffle 31 closed until the flow of grain is started. Air flow is established from outlet 44 up through the transfer tube assembly into the air flow system 13. The air flow is countercurrent to the grain flow and passes upwardly through the transfer tube assembly, the telescoping circular sections 41 and 42 which bypass the knuckle assembly 19 and into the duct 37. The flowing stream of air picks up dust from adjacent the outlet end of the transfer tube assembly and additionally controls the amount of dust by picking up dust along the length of the transfer tube assembly as the air flow passes upwardly. The air flow is then conducted by means of duct 37 into dust collector 35 where the dust is removed from the air. Substantially clean air is then ejected from the blower 33 into the atmosphere.

The apparatus and method of the present invention may be used to handle large scale transfer of grain. In this connection, grain loading of as high as 100,000 bushels per hour may be handled by the apparatus and method of the invention while restricting air pollution during the loading. The capacity of the transfer tube assembly is, of course, dependent on the cross sectional area of the tubes which are included in the assembly. For example, round tubes having a diameter of about 15 to 25 inches may be used to transfer up to 25,000 bushels per hour. Round tubes having a diameter of about 20 to 40 inches may be used to transfer up to 60,000 bushels per hour.

In general, the blower should be of sufficient size to provide an air flow that is at least three times greater in volume than the volume of the grain flow. As the amount of air which is displaced at the outlet end of the transfer tube assembly varies from about two to about five times the volume of grain flow, it is preferred that the blower be capable of providing an air flow that is within the range of from about three to about ten times the volume of grain flow which is to be transferred by means of the apparatus of the invention. Higher capacity blowers may also be used but there are no advantages to higher capacity and the cost is greater.

The velocity of the air within the transfer tube assembly is not important so long as the velocity is not sufficient to convey grain upwardly by means of the countercurrent air flow. In general, the air flow is adjusted so as to provide a maximum air velocity that is slightly less than that which is sufficient to pick up grain within the transfer tube assembly and convey it pneumatically to the dust collector. The maximum velocity which can be used varies with the configuration of the various tubes which comprise the transfer tube assembly and with the type of grain. In this connection, the tubes which comprise the transfer tube assembly need not be of round configuration and may be square or rectangular or other generally regular shape.

The following example illustrates various features of the present invention but is intended to in no way limit the scope of the invention which is defined in the appended claims.

EXAMPLE

Apparatus was constructed in accordance with the invention. The apparatus included a transfer tube assembly and an air flow assembly. The transfer tube assembly was constructed of various tubes having a minimum diameter of 22 inches. The transfer tube assembly was provided with a pivot point for lateral movement, a knuckle assembly to provide arcuate elevation and a telescoping section to adjust the outlet end of the transfer tube assembly in respect to elevation. The air flow assembly included a blower, a cyclone dust collector and a duct connecting the cyclone duct collector to the transfer tube assembly. The point of connection of the duct was intermediate the knuckle assembly and the inlet end of the transfer tube assembly. The blower of the air flow system had a capacity of 17,000 cfm.

The apparatus was used to transfer grain from a grain elevator to the hold of a ship. The grain was transferred at a flow rate of 50,000 bushels per hour.

The apparatus was first operated without the air flow system in operation and was then operated with the air flow system in operation. The grain dust contamination in the area adjacent the ship during loading was determined by means of Ringelmann charts. During transfer with the air flow system in operation the dust level in the vicinity of the ship was observed to have a Ringelmann value of 2.75. With the air flow system turned off the dust level was observed to have a Ringelmann value of 4.5. Lower Ringelmann numbers indicate reduced dust contamination.

It is apparent that the apparatus and method of the present invention may be modified extensively without departing from the scope of the invention. For example, the knuckle assembly described above need not be present in the apparatus and a bypass air line would then not be required. Also, it is not necessary to provide telescoping or pivoting sections in the transfer tube assembly or the air supply system as previously described. The scope of the present invention is set forth in the accompanying claims.

What is claimed is:

1. Apparatus for restricting air pollution and for conveying small particulate material from a supply source to a desired location at a lower elevation than the supply source comprising a transfer tube having its inlet end connected to a supply source for small particulate material, said transfer tube sloping downwardly and transversely from said supply source so as to provide upper and lower transfer tube surfaces whereby said material moves from said supply source by gravity to the outlet end of said transfer tube, suction air flow producing means, a duct connecting said air flow producing means to said upper surface of said transfer tube at a point intermediate its ends and a baffle positioned within said transfer tube, said baffle being located between said inlet end of said transfer tube and the point of connection of said duct with said transfer tube, said baffle depending downwardly from said upper surface of said transfer tube and said baffle defining an upper space within said transfer tube which is free of said particulate material and a lower space within said transfer tube which is occupied by said particulate material, said lower space in the vicinity of said baffle restraining air flow from passing to said supply source.

2. Apparatus in accordance with claim 1 which further comprises a knuckle assembly in said transfer tube for hinged lateral movement in the outlet end of said transfer tube and a bypass assembly for bypassing said air flow around said knuckle assembly, said bypass assembly including at least two telescoping, arcuate conduit sections.

3. Apparatus in accordance with claim 1 wherein said air flow producing means comprises a blower and a dust collector.

4. Apparatus in accordance with claim 1 wherein said baffle is positioned within a rectangular section of said transfer tube, said baffle being hinged at its upper edge.

5. Apparatus in accordance with claim 1 wherein said hinged baffle is provided with a counterweight.

6. Apparatus in accordance with claim 1 which further comprises means to restrain dispersion of dust from the vicinity of said outlet end of said tube.

7. Apparatus in accordance with claim 1 wherein said restraining means comprises a curtain substantially surrounding the periphery of said outlet end of said tube.

8. Apparatus in accordance with claim 1 which further comprises sensing means, said sensing means providing a signal which may be used to control the level of said outlet end of said tube.

9. A method for transferring small particulate material without air pollution from a supply source by gravity comprising the steps of conveying small particulate material downwardly and transversely from a supply source to a second location, providing a downwardly sloping enclosure surrounding said material during said conveyance, establishing an upper space within said enclosure which is free of said material, establishing lower space in said enclosure which is occupied by said material, establishing a flow of air upwardly and countercurrent to material flow within said enclosure, said air flow entering from said second location, said air flow being sufficient to pick up dust in the region of said second location and remove the dust through said enclosure and discharging said air flow and said dust from said enclosure at a point between said supply source and said second location, said air flow being restrained from entering said supply source by said occupied lower space.

10. A method in accordance with claim 9 wherein said upward air flow is at least three times the volume of said downward grain flow.

11. A method in accordance with claim 9 wherein said upward air flow is at a level of from about three to about 10 times the volume of said downward grain flow.

12. A method in accordance with claim 9 wherein said discharged air flow is passed through a dust collector.

13. A method in accordance with claim 9 wherein said upward air flow is established by means of a blower in fluid communication with said grain enclosure during conveyance.

* * * * *